INVENTORS
JAMES O. MELTON &
THOMAS B. WILKINSON
BY

ATTORNEY

INVENTORS
JAMES O. MELTON &
THOMAS B. WILKINSON
BY

ATTORNEY

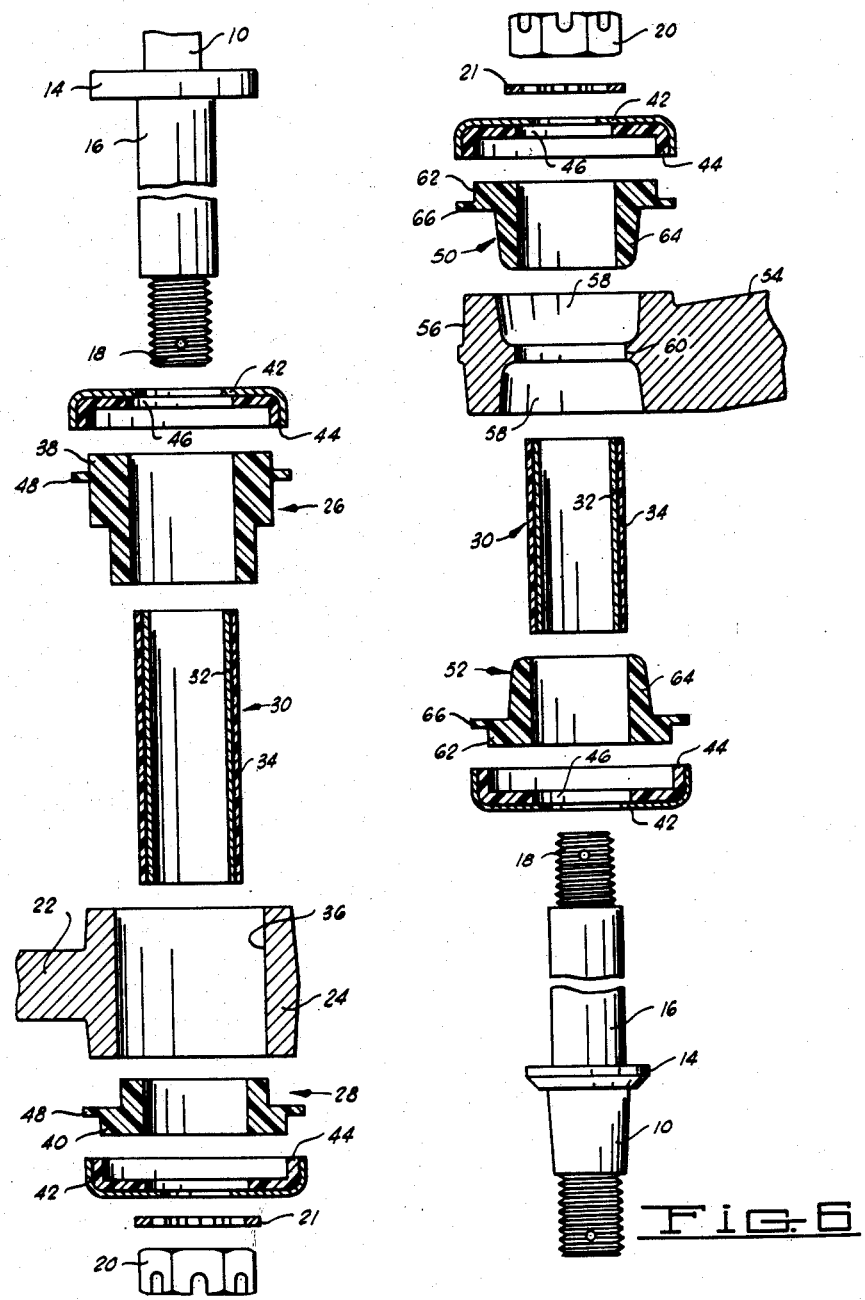

United States Patent Office 3,072,448
Patented Jan. 8, 1963

3,072,448
PIVOTAL BEARING ASSEMBLY FOR CONNECTING TWO RELATIVELY MOVING MEMBERS
James O. Melton, Norman, and Thomas B. Wilkinson, Oklahoma City, Okla., assignors to Jamco, Inc., Oklahoma City, Okla., a corporation of Oklahoma
Filed Feb. 16, 1961, Ser. No. 89,857
8 Claims. (Cl. 308—238)

This invention relates to a bearing means, and more particularly, but not by way of limitation, to improvements in pivotal bearing assemblies utilized to connect two members which move relatively to each other.

In mechanical installations of various types, it is frequently required to provide a bearing assembly located between two relatively moving members which is capable of withstanding heavy loading without the development of looseness or play and which reduces to a minimum the frictional resistance to relative movement between the two members. In some instances, the requirements of construction in this type of bearing are even more exacting in that the bearing is utilized in an environment in which the bearing assembly is subjected to contact with dust, mud, dirty water and other deleterious substances, making it necessary for the bearing assembly to be, in some manner, protected against the infiltration of these substances into the bearing.

A typical instance of the utilization of pivotal bearing assemblies of the type described occurs in the manufacture of modern automobiles. Thus, most automobiles, as manufactured today, are provided with a rod, termed a "cross rod" or "drag link," which is used to interconnect the steering mechanism of the automobile to the front wheels thereof. Generally, one end of the cross rod is supported by a crank arm which is secured to the steering column of the automobile and the other end of the cross rod is attached to the frame of the automobile by means of a short arm termed an "idler arm." To allow the cross rod to move freely in response to the steering mechanism, it is necessary to provide a pivotal bearing between the idler arm and the cross rod.

In order to reduce to a minimum the steering effort which is required by the automobile driver, the idler arm must pivot with respect to the cross rod with a minimum of frictional resistance to such pivotation. An existing method of reducing friction between these two members involves the utilization of ball or roller bearings. When the pivotal assembly using such bearings is new, the steering performance of the automobile is quite satisfactory with a minimum resistance to turning being experienced. However, the use of ball or roller bearings has been characterized by some disadvantageous features which cause their satisfactory performance to become rather short-lived. For instance, the location of the steering mechanism underneath the automobile results in the exposure of the pivotal bearing to large quantities of water, dust and mud. These deleterious substances soon find their way into the bearings, clogging the races of the ball bearing members and resulting in reduced service life and inferior performance of the bearing mechanism. Moreover, metal bearings of this type require frequent lubrication. Failure to provide the necessary lubrication quickly results in the complete destruction of the bearing.

Bearings of the type under discussion have also previously been characterized by a resilient bushing which is utilized to constantly urge the contacting portions of the bearing into contact with each other for the purpose of reducing any play or looseness which might otherwise tend to develop upon the wearing away of adjacent portions of the bearing structure. Several difficulties have, however, been experienced in pivotal bearing assembly constructions of this type. Thus, when the bearing is pre-loaded utilizing a rubber bushing, or some other similar type of resilient material, the rubber or other resilient material offers increased resistance to the free pivotation of the relatively moving members. Moreover, such rubber bushings are subject to relatively rapid wearing away and disintegration so that the bushings soon fail to fulfill their function of biasing the elements of the bearing into contact with each other and thereby reducing play and looseness.

The present invention contemplates an assembly for pivotally connecting two relatively moving members to each other in a manner which will prevent the early development of slack or looseness in the assembly but which will yet allow the connected members to be pivoted relatively to each other easily and with a minimum of frictional resistance thereto. The bearing assembly is compactly constructed and is characterized by the strategic location of seals between certain elements of the assembly which effectively reduce or prevent the ingress of mud, dust and other deleterious substances to the interior of the bearing. Although the invention will be described as it particularly applies to bearing assemblies utilized to connect the idler arm of an automobile to the cross rod, the principles of the invention are readily adaptable to any relatively oscillating mechanism, whether encountered in vehicles or otherwise.

It is therefore a broad object of this invention to provide a pivotal bearing assembly which may be utilized to interconnect two members firmly to each other and without slack and play, but which permits the two members to be pivoted or turned relatively to each other with a minimum of frictional resistance.

A more specific object of the present invention is to provide an idler arm assembly for use in automobiles, which assembly may be quickly and easily installed upon existing automobiles and which is characterized by a long and trouble-free service life.

An additional object of the present invention is to provide a pivotal bearing assembly which is resistant to the harmful effects of water, mud and dust.

A further object of the present invention is to provide a bearing assembly which does not require lubrication.

A further object of this invention is to provide an idler arm bearing assembly for use in automobiles, which bearing assembly displays a minimum of frictional resistance to turning, thereby reducing the effort required in automobile steering.

An additional object of this invention is to provide a bearing assembly for connecting two relatively moving parts, which bearing will maintain accurate alignment of the parts for a longer period of time.

These objects and advantages will be better understood, and other objects and advantages will become apparent, upon reading the following disclosure in conjunction with a consideration of the accompanying drawings which illustrate our invention.

In the drawings:

FIGURE 5 is an exploded view of the pivotal bearing assembly of the present invention as it is utilized in an idler arm mechanism of the type illustrated in FIG. 1.

FIGURE 6 is an exploded view of the pivotal bearing assembly of the present invention as it is utilized in an idler arm of the type illustrated in FIG. 2.

Figure 1:
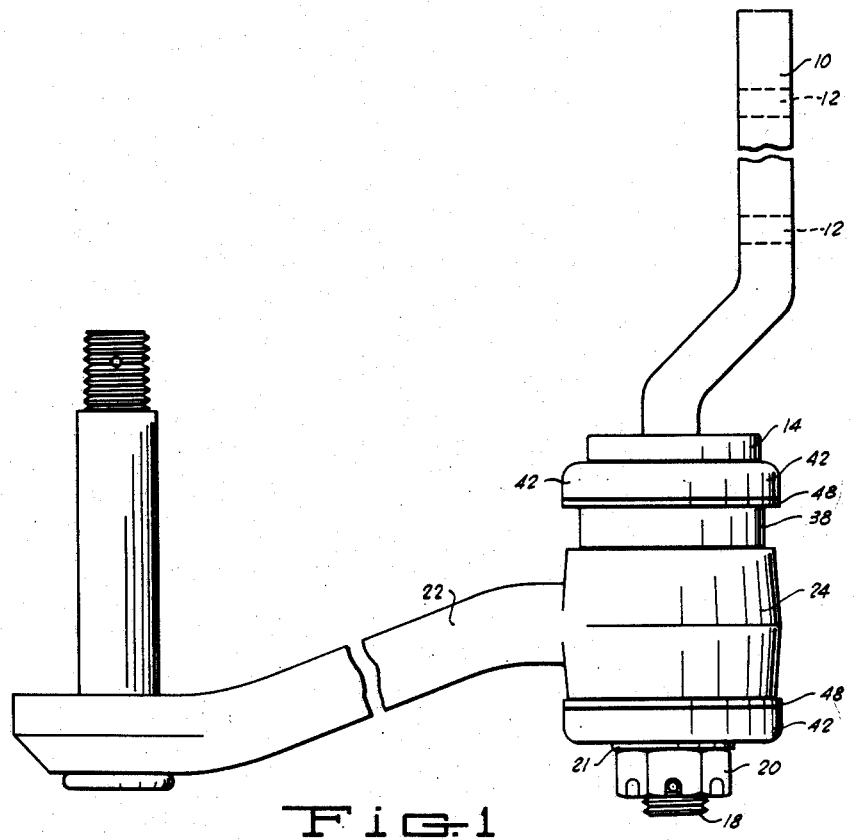
FIGURE 1 is a view in elevation of the pivotal bearing assembly of the present invention as it is utilized in one type of idler arm mechanism.

Referring now to the drawings in detail and particularly to FIG. 1, reference character 10 designates a bracket having suitable bolt holes 12 for connection of the bracket to the frame of an automobile or the like. The bracket 10 is also provided with a circumferential flange 14 and a spindle portion 16 having a smooth external periphery and extending downwardly below the flange 14. The lower end 18 of the spindle 16 is of slightly reduced diameter and is threaded to receive a nut 20 for the purpose of maintaining the various elements of the assembly in their proper relation, as will be subsequently described. A lock washer 21 is also provided between the nut 20 and the bearing assembly. An idler arm 22 of a type utilized in many automobiles presently in existence and being currently manufactured is characterized by a tubular hub portion 24 and is pivotally supported upon the spindle 16 by a novel bearing assembly which includes upper and lower bushings 26 and 28 which are each constructed of a high density synthetic resin material. The upper and lower bushings 26 and 28 surround a composite elongated sleeve 30 and form a sliding fit therewith. The composite elongated sleeve 30 includes an internal metallic sleeve 32 which is slidingly fitted around the spindle 16 of the bracket 10 and an external sleeve 34 which is constructed of a high density synthetic resin material and which is telescoped over the outer periphery of the metal sleeve 32 in a tight press-fit relation. It will be noted that the metal sleeve 32 and its surrounding resin sleeve 34 are substantially equal in length and are conterminous. Each of the bushings 26 and 28 is of a size to fit tighter in the bore 36 of the hub 24 than around the composite sleeve 30 so that the bushings 26 and 28 will rotate with the idler arm 22 during operation of the device and will effectively journal the idler arm upon the spindle 16. In other words, the fit of the bushings 26 and 28 upon the composite sleeve 30 may be described as a sliding fit, while the fit of the bushings in the bore 36 of the hub 24 is somewhat tighter and may be described as a press fit.

Figure 3:
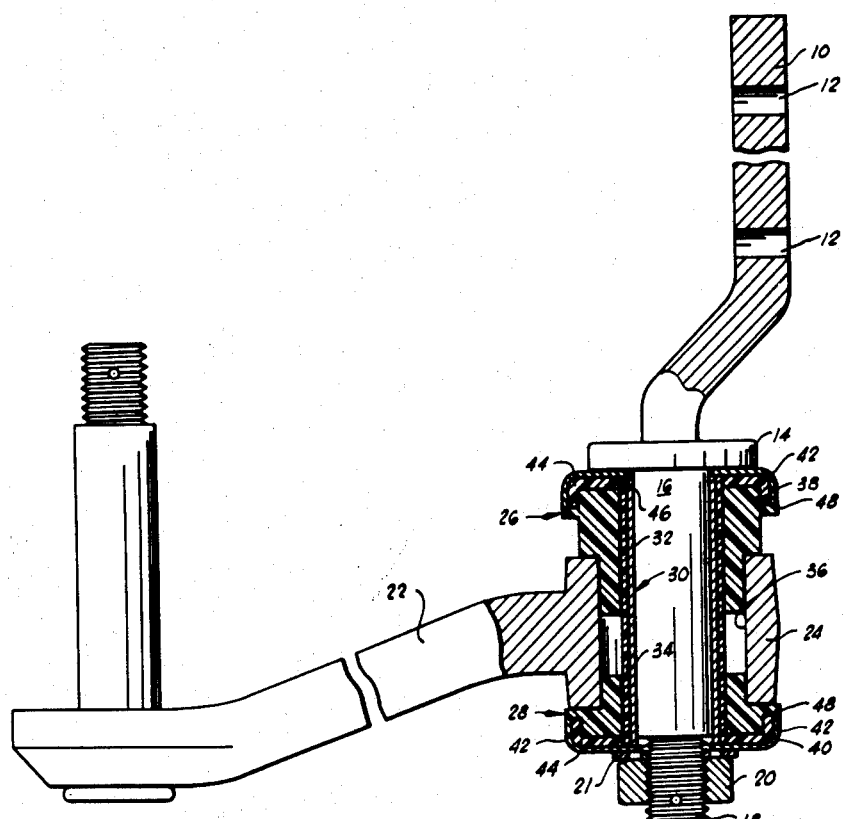
FIGURE 3 is a vertical sectional view through one end of the idler arm illustrated in FIG. 1.

If the pivotal assembly of the present invention is to be utilized as a replacement for worn-out idler arm bearings in automobiles having idler arms of the type depicted in FIGS. 1, 3 and 5, it is necessary to provide an annular shoulder 38 around the external periphery of the upper bushing 26 in order that the idler arm 22 may be properly spaced from the bracket 10 as these two elements were spaced in the manufacture of the automobile. Thus the annular shoulder 38 functions to adapt the pivotal bearing assembly of the present invention to utilization in idler arm mechanisms of the type depicted in FIGS. 1, 3 and 5 and presently in use upon some automobiles. The spacing of the idler arm 22 below the flange 14 of the spindle 16 will, of course, be determined by the dimension of the shoulder 38 measured in an axial direction along the bushing 26. A similar annular shoulder 40 is formed around the external periphery of the lower bushing 28 but is provided for a different purpose than that of the shoulder 38 and does not function as a spacer to achieve the desired spacing between the spindle 16 and idler arm 22 as does the shoulder 38. It will be noted in referring to FIG. 3 that the shoulders 38 and 40 formed on the outer end portion of each of the bushings 26 and 28 are larger in diameter than the bore 36 through the hub 24 so that these shoulders contact the upper and lower faces of the hub 24, thus providing a seal preventing the ingress of deleterious material to the interior of the hub, and also preventing the bushings 26 and 28 from being completely telescoped into the hub during assembly or operation of the bearing.

A pair of cup-shaped, metallic washers 42 are provided adjacent each end of the spindle 16 and concentrically surround the spindle with a relatively small clearance existing between the spindle and the washers. By virtue of this small clearance, the washers 42 may be said to cooperate with the spindle 16 in forming a partial seal preventing the ingress of relatively large particles of solid material to the interior of the bearing. An insert washer 44 which is constructed of a high density synthetic resin material is pressed into each of the metallic washers 42 to form a tight frictional fit therewith. It will be noted that the resin washers 44 are substantially complementary in configuration to the metal washers 42 except for the provision of central, axial openings 46 therethrough which are of sufficiently large diameter to pass the composite sleeve 30 and thus are larger than the apertures through the metal washers 42. It will further be noted that the inside diameters of the resin washers 44 are substantially equal to the outside diameters of the annular shoulders 38 and 40 of the bushings 26 and 28 so that these shoulders are snugly received by the resin washers 44 when the bearing is assembled.

For the purpose of further sealing the interior of the bearing against the undesirable entrance or infiltration of deleterious materials, a pair of thin, annular flanges 48 are formed around the external periphery of the shoulders 38 and 40 of the bushings 26 and 28, respectively, and are of a size to permit their cooperation with the edges of the resin washers 44 and metallic washers 42 in forming seals. In other words, the annular flanges 48 are characterized by a width which is substantially equal to the combined thicknesses of the resin and metallic washers 44 and 42, respectively.

Figure 2:
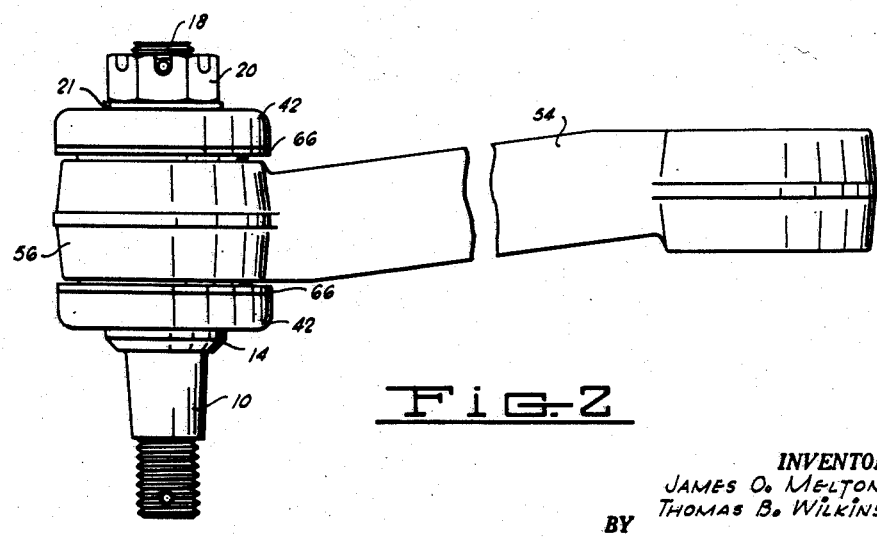
FIGURE 2 is a view in elevation of the pivotal bearing assembly of the present invention as it is utilized in a slightly different type of idler arm mechanism.
Figure 4:
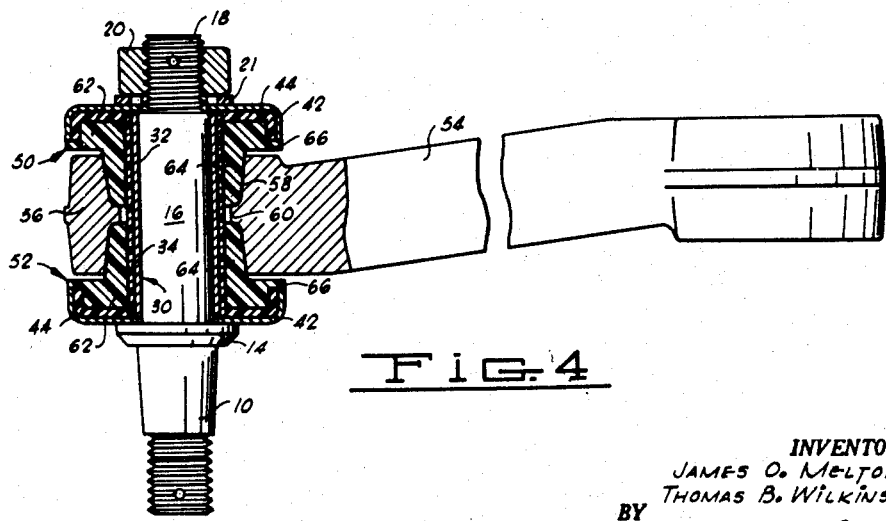
FIGURE 4 is a vertical sectional view through one end of the idler arm illustrated in FIG. 2.

In the modified embodiment of the invention depicted in FIGS. 2, 4 and 6, the elements of the bearing assembly which is there depicted are substantially the same as those of the assembly depicted in FIG. 1 with the exception of the configuration of the bushings 50 and 52 which correspond to the bearing sleeves 26 and 28 of the FIG. 1 assembly. The difference which exists between the construction of the bearing sleeves in the two embodiments is necessitated by a difference in the types of idler arms in which the assemblies are adapted to be used. Thus, in the idler arm 54 depicted in FIGS. 2 and 4, the hub 56 of the idler arm is characterized by a bore 58 which is centrally segregated by an inwardly extending seat 60 which extends around the inner periphery of the hub 56. Moreover, it will be seen in referring to FIG. 4 that the bore 58 tapers outwardly slightly from adjacent the seat 60 to the outer faces of the hub 56. This type of idler arm has been utilized in the manufacture of at least one model automobile of recent vintage and it is, of course, necessary to modify the bearing assembly depicted in FIG. 3 in order to adapt it to use in this type of idler arm. Since, in this type of idler arm, the problem of properly spacing the idler arm 54 with respect to other members of the steering mechanism does not require the employment of an annular shoulder such as that characterized by reference character 38 in FIG. 3, this particular type of shoulder has been eliminated so that the bushings 50 and 52 have formed thereon a pair of identical annular shoulders 62 which fit snugly into the resin washers 44 in the same manner as do the shoulders 38 and 40 of the bushings 26 and 28, respectively, of the assembly illustrated in FIG. 3. It will be further noted that the portions 64 of the bushings 50 and 52 which extend into the bore 58 of the idler arm hub 56 are tapered to conform to the contour of the bore and that a pair of annular flanges 66 are formed around the shoulders 62 and cooperate with the resin and metallic washers, 44 and 42, respectively, to seal the bearing (see FIGS. 2 and 4).

As has been previously indicated, the sleeve 34, the bushings 26, 28, 50 and 52, and the resin washers 44 utilized in the bearing assembly of the present invention are each composed of high density synthetic resin materials. Further than this, these resin materials are of the type which are characterized by low coefficients of friction so that the sleeve bushings and washers may properly be said to display self-lubricating characteristics.

Some of the materials which have proven satisfactory for this purpose include: polymerized olefins, such as polyethylene sold under the trade name "Marlex"; polymerized tetrafluoroethylene, such as is sold under the trade name "Teflon"; and long chain, synthetic polymeric amides, such as are sold under the trade name "nylon." We have found that in order to reduce to a minimum the resistance of the bearing to idler arm pivotation, the bushings 26, 28, 50 and 52 should preferably be constructed of a high density synthetic resin which has a different molecular structure than the molecular structure of the resins used in the construction of the resin sleeve 34 and the resin washers 44. If resins of identical molecular structure are utilized in these three elements of the bearing assembly, a tendency exists for the molecules at the mating surfaces of the members to interpolymerize with each other, thus causing the elements to stick to each other or bind rather than moving freely while in contact with each other. The difference in molecular structure to which we have referred may merely be a difference in the length of the molecular chain rather than a difference in chemical constituency. We have also found that one highly desirable type of construction is that in which the bushings 26, 28, 50 and 52 are constructed of "Marlex," while the resin sleeve 34 and the resin washers 44 are each constructed of "nylon." This arrangement yields a bearing assembly of great strength and extended service life while reducing to a minimum the frictional resistance which the bearing offers to the turning of the idler arm.

The operation and function of the invention which results from the cooperation of the various elements can be described as follows: The bushings 26, 28, 50 and 52, respectively, having a tight press fit in the bores of the idler arms 22 and 54, remain in a fixed position with respect to the idler arms during the operation of the device. The composite sleeves 30, on the other hand, remain fixed with respect to the spindles 16 by virtue of the contact of the inner metallic sleeves 32 with the outer peripheries of the spindles 16 and the abutment of the ends of the composite sleeves against the metal washers 42. The metal washers 42 are, of course, retained in fixed position with respect to the spindles 16 and brackets 10 by virtue of their large area of contact with the flange 14 and the lock washer 21. As the nuts 20 are tightened on the threaded end portions 18 of the bracket spindles 16, the ends of the composite sleeves 30 are brought into contact with the metallic washers 42, and the flat ends of the bushings 26, 28, 50 and 52 are brought into flatly abutting contact with the resin washers 44. With the bearings thus assembled, bearing surfaces exist between the bushings 26, 28, 50 and 52 and the outer periphery of the resin sleeves 34, and also the resin washers 44. Due to the lubricous characteristics of the high density synthetic resins utilized in the construction of these elements, considerable pressure can be exerted by the nuts 20 upon the assembly without imparting undue frictional resistance to the pivotation of the idler arm 22. It is also to be noted that the materials of construction of the bushings 26, 28, 50 and 52, resin sleeves 34 and resin washers 44 have slightly plastic properties so that the possibility of overloading the bearing surfaces when the nuts 20 are tightened is minimized. The preferred materials of construction of these elements also display a certain amount of resiliency so that as wear develops between the bearing surfaces, the elements tend to expand slightly so as to maintain contact of the bearing surfaces and reduce or eliminate the development of slack or looseness.

An important feature of this invention resides in the fact that all bearing surfaces exist primarily between high density synthetic resins, preferably of differing molecular structure, and secondarily between synthetic resins and metals. The low coefficients of friction of the resinous materials employed makes supplemental lubrication of the bearing by grease or oil unnecessary. Moreover, the primary bearing components are, of course, non-metallic, inert material, and are therefore not subject to corrosive attack by water, mud and other deleterious materials. All of the bearing components are fitted together in a compact relationship so that there exist no openings through which such deleterious materials can enter the bearing to reduce its service life.

This invention has been described with particular reference being made to its embodiment in an automobile idler arm mechanism. However, as has previously been indicated, the principles of the invention are readily adaptable to a number of different mechanisms in which a bearing type connection between two relatively moving members is required. Therefore, although this invention has been described with a certain degree of particularity, it will be manifest to those skilled in the art that many changes may be made in the details of construction and the arrangement of the components without departing from the spirit and scope of the invention as defined by the appended claims.

We claim:

1. An assembly for pivotally journalling an arm having a hub at one end upon a spindle, comprising a metallic tubular sleeve having a bore therethrough dimensioned to slidingly receive said spindle; a high density synthetic resin sleeve press-fitted on said metallic sleeve; high density synthetic resin bushing means slidingly fitting around said high density synthetic resin sleeve and being of a size to be pressed into said hub in tight frictional engagement with the internal wall of said hub so that said bushing means will move with said arm relative to said spindle, said bushing means projecting at its ends from each end of said hub; dished metallic washers around said spindle adjacent each projecting end of said bushing means; and high density synthetic resin liner washers in the concavity of each of said metallic washers and bearing against the projecting ends of said bushing means.

2. An assembly as claimed in claim 1 wherein said resin sleeve and said liner washers are constructed of a high density synthetic resin which is of a different molecular structure than that from which said bushing means is constructed whereby said bushing means may turn freely relative to said resin sleeve and liner washers, and polymerization between the molecules of these elements is avoided.

3. An assembly as claimed in claim 1 wherein said bushing means comprises a pair of bushings pressed into each end of said hub, said bushings each having a circumferential flange around the outer periphery of the portion thereof which projects from said hub, said flanges cooperating with the adjacent edges of said dished metallic washers to seal the interior of said assembly against the ingress of deleterious substances.

4. An assembly as claimed in claim 1 wherein said dished metallic washers are each characterized by a central aperture dimensioned to pass said spindle; and wherein said resin liner washers are each characterized by a central aperture aligned with said washer aperture, said liner washer apertures being of a size to slidingly receive the respective ends of said resin sleeves.

5. An assembly as claimed in claim 3 wherein said dished metallic washers are generally cup shaped in configuration, having a disc shaped base with a centrally located aperture therein, and an axially extending, circumferential flange around the periphery of said base; and wherein said resin liner washers conform generally in shape to said metallic washers and are pressed into said washers; and wherein each of said bushings is provided with an annular shoulder around its external periphery extending between its respective flange and its end projecting from said hub, said shoulders being of a size to fill said liners when said liners are in contact with said bushings.

6. An assembly as claimed in claim 3 wherein said bushings are provided with a cylindrical bore therethrough, and are characterized by an outside diameter which diminishes in magnitude from the ends of said bushings outside said hub to their ends inside said hub whereby said bushings may be wedged securely in said hub.

7. An assembly as claimed in claim 2 wherein said resin sleeve, liners and bushing means are composed of materials selected from the group consisting of polymerized olefin, polymerized tetrafluoroethylene and polymerized amide.

8. An assembly as claimed in claim 1 wherein said bushing means is provided with an annular shoulder extending around its outer periphery and forming an abutment limiting the movement of the bushing means into said hub; and characterized further to include a pair of annular flanges around said bushing means cooperating with said metallic washers to seal the interior of said assembly against the ingress of deleterious substances.

References Cited in the file of this patent
UNITED STATES PATENTS

| | | |
|---|---|---|
| 2,251,936 | Heftler | Aug. 12, 1941 |
| 2,797,929 | Herbenar | July 2, 1957 |
| 2,815,252 | Baker | Dec. 3, 1957 |
| 2,952,486 | Reuter | Sept. 13, 1960 |